Aug. 26, 1941.  F. M. CLARK  2,253,507
ELECTROLYTIC CAPACITOR AND IMPREGNANT THEREFOR
Filed Feb. 1, 1940
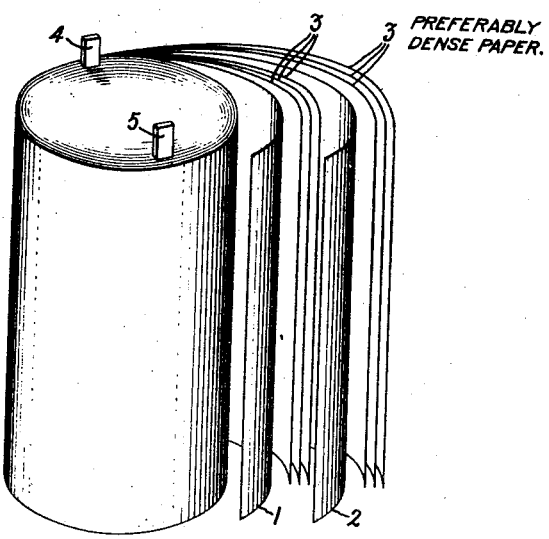
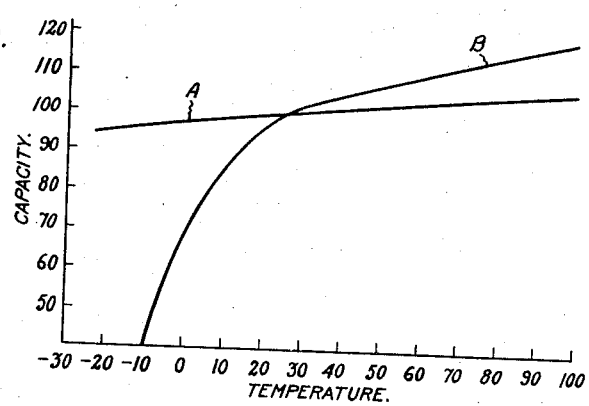
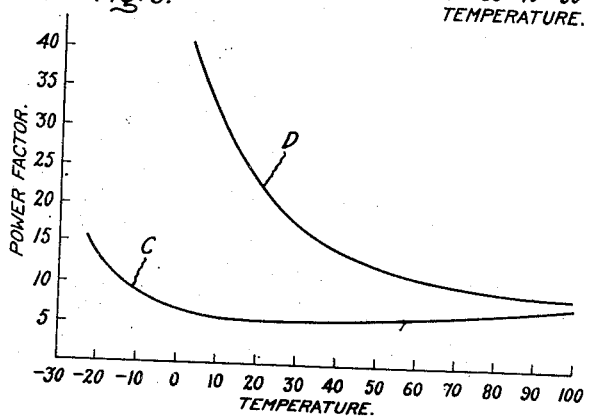
Inventor:
Frank M. Clark,
by Harry E. Dunham
His Attorney.

Patented Aug. 26, 1941

2,253,507

UNITED STATES PATENT OFFICE 2,253,507

ELECTROLYTIC CAPACITOR AND IMPREGNANT THEREFOR

Frank M. Clark, Pittsfield, Mass., assignor to General Electric Company, a corporation of New York Application February 1, 1940, Serial No. 316,793

13 Claims. (Cl. 175—315)

The present invention constitutes an improvement in electric capacitors of the electrolytic type. Its object is to provide capacitors of high efficiency, that is, having a high capacity per unit of volume, also having a high degree of stability when operated at temperatures either well above or well below ordinary room temperature, and having relatively low power losses (low power factor) over the entire range of operating temperatures. This application is a continuation-in-part of my application Serial No. 248,762, filed December 31, 1938. In said prior application claims have been made which are generic to the invention claimed herein.

In accordance with one feature of my invention, I have provided electrolytic capacitors which contain as electrolyte a highly mobile, suspension-free solution of a suitable ionogen in water-soluble polyhydroxy ether associated with polyhydric alcohol. In accordance with another feature of my invention, I employ in combination with the capacitor armatures paper spacers of high density (non-porosity), which are readily and completely impregnated with such electrolyte.

Fig. 1 of the accompanying drawing illustrates in side elevation a roll type capacitor in which my improved composition is embodied, and Figs. 2 and 3 are graphs of temperature characteristics.

The capacitor shown in the drawing comprises cooperating armatures 1, 2 consisting of aluminum foil or other suitable material. The foil advantageously, but not necessarily, may be etched and formed (or filmed) in accordance with known practice.

Between the armatures is a spacer 3 consisting of paper, or other suitable insulating material. For example, three sheets of non-porous, thin kraft paper may be used, although my invention is not restricted to this particular kind of paper nor to any specific number of layers. The kraft paper preferably should be of high density. One of the resulting advantages is a marked reduction in physical size per unit of capacity of the resulting capacitor (condenser). Advantageously, the paper should have a specific gravity greater than .75, and preferably .90, or even higher. Its air resistance preferably should be greater than 3000 seconds or more, advantageously 12,000 seconds, or even higher, when measured on the Gurley densometer. The paper should be free of chlorides, or substantially so. Its thickness should be no more than about .001 inch, and more desirably thinner, say .0005 inch or less.

Although fabrication of capacitors with a more highly absorbent, porous paper, which is subsequently impregnated with my novel electrolyte, is not precluded, and such capacitors possess in a large measure the desirable temperature characteristics of my invention, it is advantageous to employ a dense, non-porous capacitor paper, particularly when minimum volume is desired. Terminal connectors 4, 5 are provided as usual. An enclosing casing has not been shown in order to simplify the drawing.

Heretofore, electrolytes comprising a glycol borate type of compound have been used in electrolytic capacitors. Such electrolytes ordinarily are pasty or cheese-like solid compositions, the glycol borate being formed by the reaction of boric acid and glycol at temperatures of 130° C. or higher. They are not clear solutions even at the highest temperatures at which the impregnation of capacitors is carried out. In many instances it has been found necessary to apply such electrolytes by mechanically spreading the electrolyte on the spacing material. In fact, it has been proposed to employ thin slices of such semi-solid compositions, without paper spacers, as dielectric elements.

The electrolytes embodying the present invention are clear solutions of the ionogen which remain liquid even at the lowest temperature to which capacitors are exposed. These electrolyte solutions may be easily pumped, thus facilitating circulation in an impregnation apparatus. Because of its freedom from suspended matter, such liquid electrolytes completely and quickly penetrate the capacitor assembly, thereby insuring a uniformity of electrical characteristics and stability at all temperatures to which it will normally be subjected during service use.

The electrolyte mixtures containing a hydroxy ether as a substantial ingredient, which constitutes the liquid medium or base of my improved electrolyte, has in solution an ionogen which may constitute about 1 to 25 per cent by weight of the liquid base, the exact proportion depending on the hydroxy ether selected as the solvent and the type and value of voltage to which the treated capacitor is to be subjected. Advantageously, an appreciable amount of water, up to 5 per cent, may be present.

Diethylene glycol ($\beta\beta'$ dihydroxy diethyl ether), associated with a modifying medium, such for example as ethylene glycol, may be used as the solvent medium. Diethylene glycol, $$(CH_2OH—CH_2)_2O$$

has a boiling point of about 244° C., a freezing point of −10.4° C., and a specific gravity (15° C. referred to water at 15° C.) of 1.1212. The hydroxy ethers have a relatively high electrical resistance which is suited for modification to a desired lower value by the simple solution therein of the chosen ionogen.

As ionogen I may employ a borate, oxalate, citrate, tartrate, acetate, or a phosphate salt of an alkali radical (including ammonium). Although from the standpoint of stability at high idling temperature the sodium, potassium or ammonium salts of the tartaric, phosphoric, acetic, boric, citric or oxalic acids all have been found to be useful, I prefer an ammonium salt. These salts are well adapted for even the highest alternating or direct current voltages normally applied to capacitors of this type. They are well adapted for use on circuits charged to approximately 220 volts alternating current or to 400 to 500 volts direct current. For 110 volt alternating current application, capacitors treated with an electrolyte solution of dihydroxy diethyl ether containing about 10 to 20 per cent ammonium borate and several per cent of water are of particular utility.

Solution of the ionogen in the hydroxy ether and ethylene glycol compositions may be promoted by heating the composition to a temperature of about 100° C., which, however, is not sufficiently high to cause chemical reaction between the liquid and the ionogen.

The electrolyte composition can be prepared by causing chemical combination between boric acid and ammonia in the presence of the hydroxy ether. For example, a solution by weight of 20 parts of boric acid in 80 parts of the ether is treated with gaseous ammonia ($NH_3$) until neutral or slightly alkaline condition (pH=7 to 7.4) is obtained. This treatment results in the formation and solution of hydrated ammonium borate in the ether. The presence in the final product of the water formed during the reaction is not objectionable. It is preferred, however, for reasons of manufacturing utility, that the amount of water present should be controlled between optimum limits. Water content ranging from about 3 to 5 per cent has been found to be suitable. The ammonium borate, or other chosen ionogen, also may be introduced into the dissolving medium in a previously formed state, the crystalline material of course being associated with water of crystallization.

The hydrated ionogen should not be in excess of the amount which the liquid carrier or base will retain in solution at the ordinary temperatures to which it may be exposed in use. The product should be a clear, limpid, and somewhat oily liquid having a water-white or pale amber color. At room temperature it does not show the presence of excess undissolved crystalline material. The borate of the hydroxy ether is not formed by either method of preparation as part of the electrolyte. As heretofore stated, the formation of such a compound would result in an increased viscosity and a tendency toward a putty or cheeselike physical state, together with an increase in resistance of the electrolyte. These factors increase the difficulty of efficient capacitor impregnation and give increased electrical losses to the treated capacitor. Formation of such compounds should be avoided by maintaining the electrolyte in a neutral or preferably slightly alkaline state, thus avoiding the possible reaction between the hydroxy ether compound and acidic materials. In factory use, contaminated electrolyte is easily recovered by the simple vacuum distillation of the hydroxy ether solvent.

Changes in the electrolyte normally involve the evaporation of water, the course of which is easily followed by refractive index measurements. The loss of water to the point that the ionogen salt begins to be dehydrated is manifested either by increased resistance or by the precipitation of the dehydrated crystals from solution. Water then may be added in quantities determined by refractive index measurements. Evaporation records, visual inspection, and refractive index measurements are adequate safeguards against the possible formation of the borate derivative of the hydroxy compound.

In the place of the dihydroxy ether which has been used to illustrate this invention, I may use a variety of water-soluble hydroxy ethers, either alone or in combination with one another. Examples of suitable alternative ether solvents are the following:

(a) *Monohydroxy ethers*

Monomethyl monohydroxy ethyl ether, a liquid boiling at 125° C.

Monoethyl monohydroxy ethyl ether, a liquid boiling at 134° C.

Monohydroxy ethyl propyl ether, a liquid boiling at 150° C.

Monohydroxy ethyl butyl ether, a liquid boiling at about 170° C.

(b) *Polyhydroxy ethers*

2,3 dihydroxy propyl methyl ether, a liquid boiling at 196° C. under 128 mm. of mercury.

2,4 dihydroxy butyl methyl ether, a liquid boiling at 121° C. under 12 mm. of mercury.

2,4 dihydroxy butyl ethyl ether, a liquid boiling at 210° C.

(c) *Mono- and polyhydroxy polyethers*

αα dimethoxy β hydroxy propane, a liquid boiling at 225° C.

Sym. di(β hydroxy ethoxy) ethane.

The symmetrical di(β hydroxy ethoxy) ethane is of utility in many of the higher voltage electrolytic capacitors. Because of its resemblance to the glycol residue, this material is often referred to as triethylene glycol. It has the structural formula:

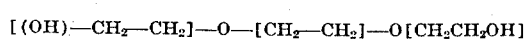

This material is a liquid boiling at 290° C. and with a specific gravity of 1.11 at 20° C. When compounded with ionogen of the type including the oxalate, acetate, phosphate, borate, tartrate, or citrate, high resistant, clear electrolytes suitable for high voltage direct or alternating current application are obtained. Thus, an electrolyte containing 10 per cent ammonium borate and 90 per cent of this polyhydroxy ether is a clear solution having a resistance at 90° C. of approximately 1230 ohms per cm. cu. Capacitors treated with this product are characterized with low losses at 220 volts and exhibit at 100° C. a marked stability on an idling (shelf) test. Claims generic to two-element compositions of this type are made in my prior application Serial No. 248,762, filed December 31, 1938.

As above indicated, advantages may be obtained by the use of my improved electrolytes in composition comprising one or more hydroxy ethers in combination with one another and other modifying ingredients. A wide range of electrolyte resistance is available by properly selecting the hydroxy ethers and other ingredients. A blend of solution of 10 per cent ammonium borate or other ionogen in a mixture containing equal amounts by weight of sym. di($\beta$ hydroxy ethoxy) ethane and $\beta\beta'$ dihydroxy diethyl ether is of utility for the alternating current circuits at voltages above 110 volts and direct current circuits as high as 400 to 500 volts.

The hydroxy ether can be blended with ethylene glycol, which has a lower resistivity, in order to produce a capacitor suited for 110 volts alternating current circuits. The following are examples of such blended compositions which are claimed herein:

| | Parts by weight |
|---|---|
| Diethylene glycol | 40 to 45 |
| Ethylene glycol | 40 to 45 |
| Ammonium borate | 20 to 10 |

A preferred mixture contains the following proportions:

| | Parts by weight |
|---|---|
| Diethylene glycol | 45 |
| Ethylene glycol | 45 |
| Ammonium borate | 10 |

Such an electrolyte mixture has the following average characteristics:

| | |
|---|---|
| Refractive index at 25° C. | 1.4400–1.4430 |
| Specific gravity (100°/15.5° C.) | 1.098 |
| Specific gravity (25°/15.5° C.) | 1.152 |
| Color | Water-white |
| Condition at 25° C. | Thin, clear liquid |
| Pour point | –48° C. |
| Viscosity at 100° C. | 3.6 centipoise |
| Viscosity at 37.8° C. | 27.0 centipoise |
| Flash point | 128° C. |
| Burn point | 146° C. |
| Electrical resistivity at 25° C. | 1700–1900 ohms cm³. |
| Electrical resistivity at 90° C. | 240–280 ohms cm³. |

Capacitors containing between the armatures three sheets of thin, dense paper, preferably kraft paper (.0005"), and being impregnated with the above type of electrolyte, and in particular the immediately preceding preferred mixture, have high capacity and marked temperature stability. When their operating temperature rises from 25° C. to 100° C., their capacity increases about 7 per cent. Even more important is the fact that, when their temperature falls from 25° C. to 0° C., no substantial decrease in capacity is evident. When the temperature drops to the extreme of –25° C., a decrease in capacity of only about 6.5 per cent results. Other types of capacitors either become inoperative at such low temperature, or have their capacities reduced to small fractions of their original value. Another example of blended electrolyte may be prepared from equal parts by weight of ethylene glycol and the higher resistant sym. di($\beta$ hydroxy ethoxy) ethane. Such a mixture containing 20 per cent by weight of ammonium borate is a clear solution with a resistance well adapted for use in electrolytic capacitors intended for 110 volt alternating current application. When used in the standard oxidized foil capacitor construction, this electrolyte gives power factor at 110 volts alternating current of less than 6 per cent with the normally high capacity value and marked stability on shelf and voltage tests.

The rolled assembly of capacitor armature foil and spacer (or other suitable capacitor assembly) is impregnated with electrolyte by known methods. For example, the liquid electrolyte may be caused to impregnate the assembly while held in contact therewith under pressure at a temperature of about 75° to 100° C. for from one-half to one or more hours. The impregnated units finally are sealed into containers.

110 volt alternating current capacitors so made in their most compact state have an average capacity of about 5 to 8 microfarads per 10 square inches of armature surface and operate initially at 25° C. with a power factor as low as 4 per cent.

In general, it may be said that capacitors embodying my invention are remarkably stable when subjected to elevated temperatures. Experience has indicated that ordinarily capacitors are adversely affected by subjection to elevated temperatures while idle. Capacitors made as herein described, when kept at 100° C. for long idle periods of time, show substantially no film deterioration. One of the indications of deterioration is an increase in capacity which may be only temporary, the capacity readjusting itself when voltage is applied, or may be of a permanently high value, depending on the degree of deterioration. The present capacitors have shown a substantially stable capacity even when maintained idle for 125 days at 100° C. The power factor (measure of energy loss) is substantially stable over operating temperatures ranging from 25 to 100° C. and after long idle periods at 100° C. The highest degree of stability is obtained with a concentration of ionogen of about 10 per cent.

Fig. 2 is a graph of the capacity characteristics of my improved capacitors over a wide range of temperatures. Curve A shows the characteristics of capacitor units containing dense kraft paper spacers impregnated with a polyhydroxy ether composition embodying my invention. It will be observed that over a range of temperatures from about –22° C. to about 100° C., the capacity increases slightly, but there is no abrupt change. Curve B shows for comparative purposes the capacity values over a range of temperatures of the same kind of capacitor impregnated with a composition which does not embody my invention. Although the unit having the characteristic illustrated by graph B has, at temperatures at and above room temperature, an even higher capacity than the unit embodying my invention, its capacity drops very sharply below room temperature, which, of course, is undesirable. In fact the rate of increase of capacity above room temperature shown by graph B is disadvantageous for many purposes.

Fig. 3 is a graph showing that the power factor of my improved capacitor changes little over a wide range of temperatures. Curve C shows the power factor characteristics of a capacitor unit insulated with several sheets of dense paper and impregnated with a polyhydroxy ether and ethylene glycol composition embodying my invention. It will be observed that at temperatures even as low as about –20° C., the power factor does not rise to prohibitively high values. The curve D represents the characteristics of a similar unit impregnated with the same prior electrolyte not embodying my invention as the unit having the capacity temperature characteristic of curve B, Fig. 2. It will be observed that the power factor of this unit over the entire range of temperatures below 100° C. rises with falling temperatures. The rise becomes very rapid as the temperature falls below about 40° C.

The fall in capacity values below room temperature and the rise of power factor at low temperatures in units containing the electrolyte shown for comparison purposes would be less steep if, in place of kraft paper, a highly absorbent tissue were used as a spacing material. Such additional curves have not been shown in order to render the comparison as clear as possible and to illustrate the benefits obtained with my improved electrolyte in capacitors containing dense paper which are of minimum size for a given power rating.

Although low temperature stability is the outstanding improvement characterizing the present improved capacitors containing .0005 inch dense kraft paper and electrolytes therefor, these improved capacitors also are characterized by a remarkable increase in efficiency. Their volume for a given rating is at least one third less than conventional forms of electrolytic capacitors. In other words, the most improved prior commercial electrolytic capacitors heretofore in use have a physical size or volume at least 50 per cent greater than capacitors made in accordance with the present invention. Other electrolytes commonly used, such as those containing the glycol borate compound prepared from reacting ethylene glycol and boric acid, give unsatisfactory electrical characteristics when used with the thin, dense kraft paper described. The high efficiency and improved characteristics hence are due to a combination of physical and chemical properties of the paper spacers and the impregnating composition.

What I claim as new and desire to secure by Letters Patent of the United States is:

1. An electrolyte composition suitable for use in capacitors comprising mainly a mixture of polyhydroxy ether and ethylene glycol, and an ionogen dissolved in said mixture, the amount of ionogen being such that undissolved crystalline material is not present over the range of operating temperatures.

2. A normally liquid composition suitable for impregnating electric capacitors comprising a liquid base of dihydroxy ether and ethylene glycol and about 1 to 25 per cent by weight of an ionogen dissolved in said base.

3. A normally liquid composition suitable for impregnating electric capacitors comprising a hydroxy ether, ethylene glycol, and an ionogen.

4. A normally liquid electrolyte composition suitable for electric capacitors comprising dihydroxy ether, ethylene glycol and hydrated ammonium borate dissolved therein, said borate constituting about 10 to 20 per cent by weight of said other ingredients.

5. A liquid capacitor electroylte consisting essentially of diethylene glycol, ethylene glycol, about 3 to 5 per cent of water, and about 10 per cent of ammonium borate.

6. A composition which is suitable for impregnating electric capacitors and comprises by weight about 40 to 45 parts of diethylene glycol, about 40 to 45 parts of ethylene glycol and about 20 to 10 parts of an ionogen.

7. A composition which is suitable for impregnating electric capacitors and comprises about 45 parts of diethylene glycol, about 45 parts of ethylene glycol, and about 10 parts of ammonium borate.

8. A liquid electrolyte adapted for use in electric capacitors comprising as essential and substantial ingredients an ionogen, and a solvent therefor consisting of a mixture of symmetrical di(beta hydroxy ethoxy) ethane, and ethylene glycol.

9. A composition adapted for use in electric capacitors comprising a liquid component of substantially equal parts of di(beta hydroxy ethoxy) ethane, and ethylene glycol, and an ionogen dissolved in said liquid component.

10. In an electrolytic capacitor comprising filmed aluminum armatures and interposed dense paper spacer, an impregnating composition comprising at least one polyhydroxy ether, ethylene glycol and an ionogen consisting of a salt of an alkali.

11. In an electrolytic capacitor comprising filmed aluminum armatures and interposed dense paper spacer, an impregnating composition comprising at least one polyhydroxy ether, ethylene glycol, about 3 to 5 per cent water and about 10 to 20 per cent of ammonium borate.

12. In an electrolytic capacitor comprising filmed alluminum armatures and interposed sheets of dense kraft paper having an air resistance above 3000 seconds, a liquid electrolyte which permeates said paper and consists of a mixture of liquid diethylene glycol, ethylene glycol, an ionogen, and several per cent of water.

13. An electrolytic capacitor comprising the combination of filmed aluminum armatures, interposed sheets of dense .0005 inch kraft paper having an air resistance within the range of 3000 to 12,000 seconds measured by Gurley densometer, and having a specific gravity greater than .75 and an impregnant in said paper spacer comprising about 40 to 45 parts diethylene glycol, about 40 to 45 parts ethylene glycol, and about 20 to 10 parts of ammonium borate.

FRANK M. CLARK.